United States Patent

[11] 3,586,924

| [72] | Inventors | Horst Gebert;<br>Silvia Lipka; Martin Meyer, all of<br>Nurnberg, Germany |
|---|---|---|
| [21] | Appl. No. | 791,037 |
| [22] | Filed | Jan. 14, 1969 |
| [45] | Patented | June 22, 1971 |
| [73] | Assignee | International Standard Electric<br>Corporation<br>New York, N.Y. |
| [32] | Priority | Jan. 15, 1968 |
| [33] | | Germany |
| [31] | | St 22 141 GM |

[54] SOLID ELECTROLYTIC CAPACITOR HAVING ANODE BODIES COMBINED IN AN INTEGRAL UNIT
7 Claims, 3 Drawing Figs.

| [52] | U.S. Cl. | 317/230,<br>317/242 |
|---|---|---|
| [51] | Int. Cl. | H01g 9/05 |
| [50] | Field of Search | 317/230,<br>231, 233 |

[56] References Cited
UNITED STATES PATENTS

| 3,115,596 | 12/1963 | Fritsch | 317/230 |
|---|---|---|---|
| 3,345,545 | 10/1967 | Baurgault et al. | 317/230 |
| 3,349,294 | 10/1967 | Heinimann et al. | 317/230 |
| 3,491,270 | 1/1970 | Gabriel et al. | 317/230 |

*Primary Examiner*—James D. Kallam
*Attorneys*—C. Cornell Remsen, Jr., Walter J. Baum, Percy P. Lantzy, Philip M. Bolton, Isidore Togut and Charles L. Johnson, Jr.

ABSTRACT: A capacitor includes two metallic anode bodies positioned close together and having a dielectric oxide coating thereon, a layer of semiconducting material over the oxide coating and a conducting layer over the semiconducting material, the semiconducting layer being between the bodies and the conducting layer at least partially surrounding the bodies to form an integral structure.

SOLID ELECTROLYTIC CAPACITOR HAVING ANODE BODIES COMBINED IN AN INTEGRAL UNIT

BACKGROUND OF THE INVENTION

1. Field of the Invention

The present invention relates to an electrical capacitor in which a sintered body of valve metal, such as tantalum, aluminum, niobium or titanium is provided with a dielectric oxide layer on which there is positioned a semiconductor layer which, in turn, is covered with an electrically conducting layer. Such capacitors are generally referred to as solid electrolytic capacitors.

2. Description of the Prior Art

As a rule, tantalum is used as the valve metal, although other valve metals are also suitable. The semiconductor layer mostly consists of an oxide slightly emitting oxygen, such as manganese dioxide. It is also possible, however, to use other oxides, such as lead dioxide. The conducting layer may consist of solder or of a conducting lacquer. If necessary, it may also consist of several conducting layers which are deposited successively. Thus, for example, it is customary to deposit on to the semiconductor layer of manganese dioxide, first of all a conducting layer of graphite, and to apply on to this graphite layer, either conducting silver or a layer of solder. The one lead-in conductor, in such types of capacitors, consists of a wire which is connected to the conducting layer, whereas the other lead-in conductor consists of a pin or a wire of valve metal which is sintered into the sintered body.

From the German Pat. No. 1,101,621, it is known to build up a tantalum capacitor in such a way that several sintered bodies are used, with the sintered leads being connected together. This conventional type of capacitor, however, concerns a capacitor employing a liquid electrolyte.

From the German Pat. No. 1,142,967 it is known to build up a tantalum capacitor with a semiconductor layer, consisting of two sintered bodies between which there is sandwiched the semiconductor layer. With this conventional type of embodiment there is likewise obtained a bipolar capacitor. In distinction to the present invention, however, in this conventional type of embodiment the two sintered bodies are arranged to engage one another, in such a way that the one sintered body serves to hold the other sintered body in position. A complicated spatial form is required for the one sintered body and a certain pressure is necessary in the first one to hole the second sintered body in position, with this being the cause of damage to the semiconductor layer, or the dielectric oxide film or layer. Unlike the conventional arrangement, the present invention permits use of simple types and shapes of sintered bodies, and relatively little pressure is applied to the layers arranged between the sintered bodies.

SUMMARY OF THE INVENTION

According to the invention, the electrical capacitor is built in such a way that at least two sintered bodies are provided which, in common, are surrounded by the semiconductor layer and/or by the conducting layer. In this way the sintered bodies are combined to form one structural unit. Depending on the arrangement of the connecting terminals, one such type of capacitor may represent a bipolar capacitor, or else a capacitor having double the capacity of a single or individual sintered-body type of capacitor.

Such electrical capacitors can be manufactured in a simple way because during the application of the semiconductor layer and/or of the conducting layer, the sintered bodies only need to be arranged next to each other to permit the applied or deposited layer to at least partially surround the sintered bodies in common.

In this way it is possible for capacitors of higher capacity to be built from uniform or standard types of sintered bodies, so that it is no longer necessary to manufacture sintered bodies in several sizes and shapes. In addition thereto, it is possible to build bipolar capacitors.

The novel features and various embodiments of the invention will now be described in detail with references to the accompanying drawings.

DESCRIPTION OF THE PREFERRED EMBODIMENTS

Figure 1:
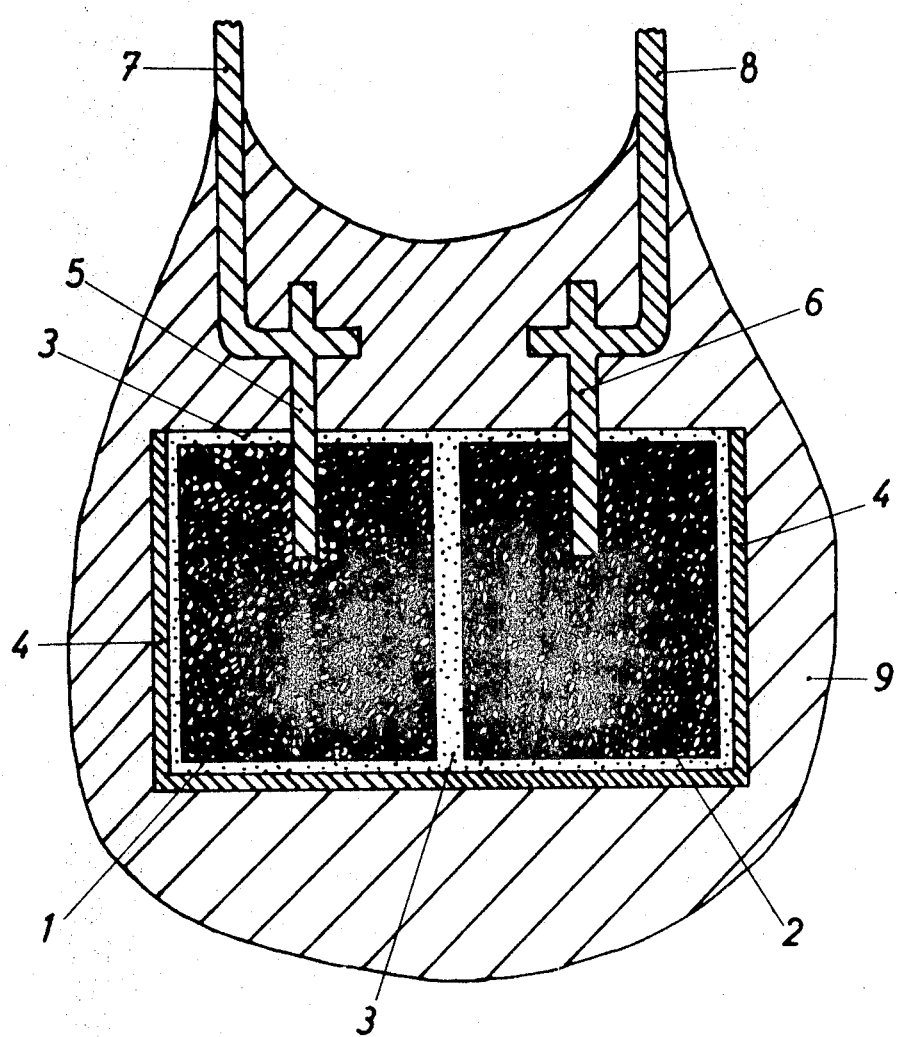
FIGS. 1 to 3 show several sectional elevations taken through the capacitors with different connecting lead arrangements.

FIG. 1 shows a sectional view taken through a capacitor in which two sintered bodies 1 and 2 are combined to form one capacitor. The sintered bodies, for example, consist of tantalum, and are coated with an insulating layer of dielectric oxide. Into the sintered bodies, and in a known manner, there are sintered lead-in wires of tantalum, indicated by the reference numerals 5 and 6. The two sintered bodies 1 and 2 are surrounded by a layer of semiconducting material 3 which also fills the pores of the sintered bodies and the interspaces between the two sintered bodies. The semiconductor layer consists, for example, of manganese dioxide and has been produced by decomposing an aqueous solution of manganese nitrate. The common semiconductor layer 3 extends around and between the two sintered bodies 1 and 2. On to the semiconductor layer 3 there is deposited a partially surrounding conducting layer 4 which may also consist of several partial layers of conducting substances. Appropriately, the outer portion of the conducting layer 4 consists of a layer of solder. The lead-in wires 5 and 6 are suitably connected to terminal wires 7 and 8, preferably consisting of a readily solderable metal. Whenever the capacitor, as is shown in FIG. 1, is supposed to be provided with an envelope 9 of a plastic material by way of dipping, the connecting points between the lead-in wires 5 and 6 and the connecting wires 7 and 8 are appropriately designed so that the plastic material 9 will adhere to the wires. As is shown, this can be achieved, for example, by providing a cross-shaped connecting point with projecting ends, as has already been proposed earlier.

Appropriately, the sintered bodies 1 and 2 are of a square of cylindrical shape, and are arranged close together in such a way that the longitudinal axes thereof extend parallel in relation to each other.

In the type of embodiment according to FIG. 1 each of the lead-in wires 5 or 6 is provided with a separate connecting wire 7 or 8 respectively. Since the conducting layer 4 constitutes a lead-in conductor connected to the semiconductor layers which are provided in common to the two capacitor bodies 1 and 2, a bipolar capacitor will be obtained in this way.

Figure 2:
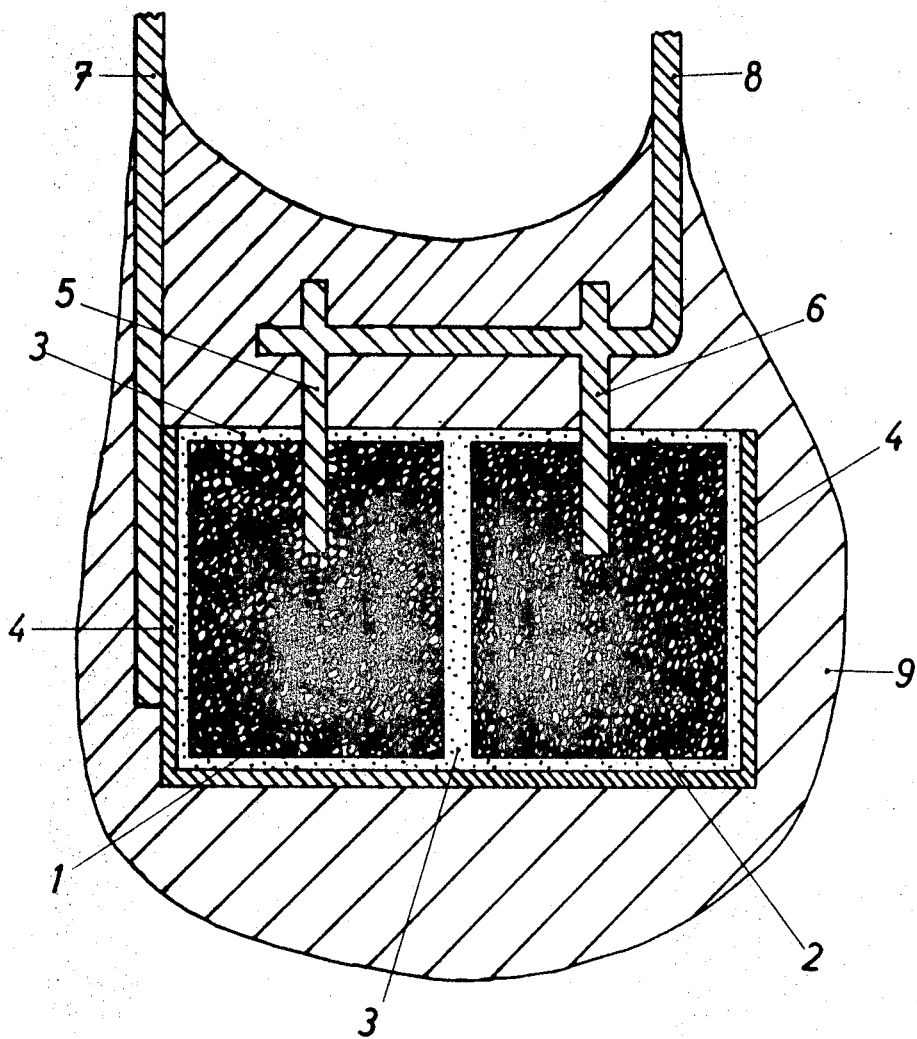
Figure 3:
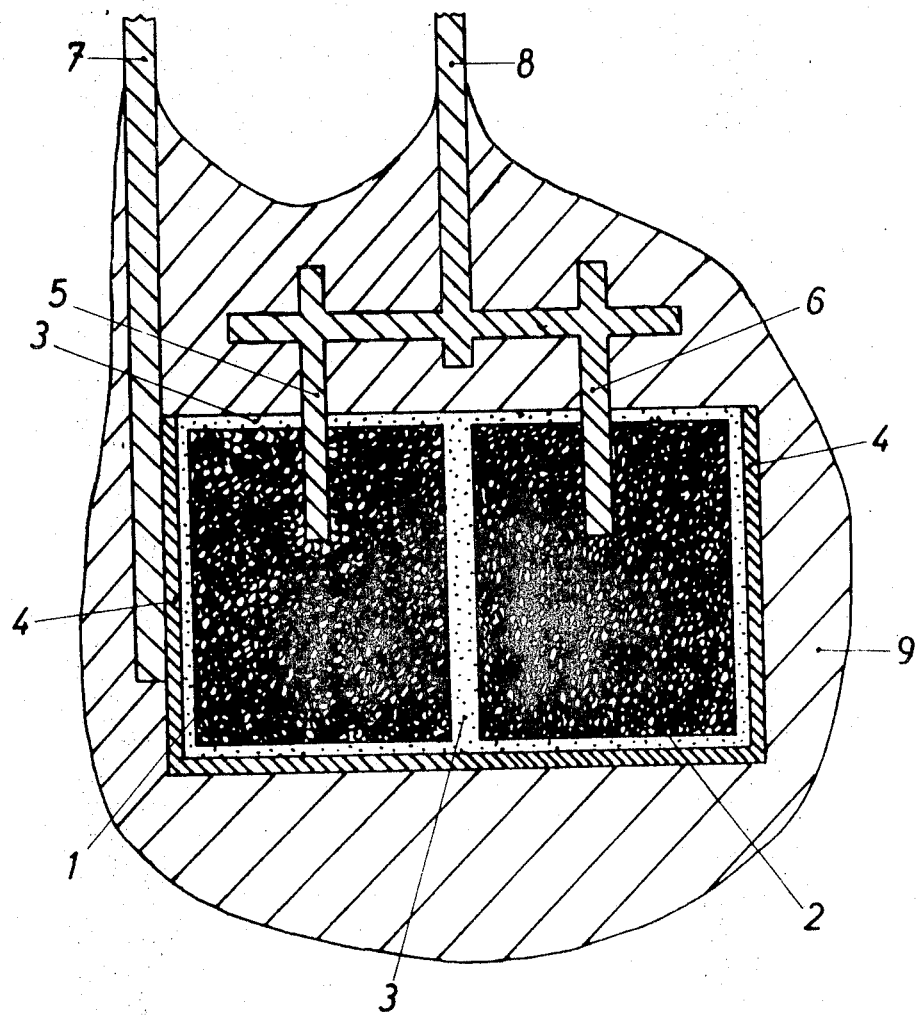

According to the present invention, however, the capacitor may also be built in such a way that a polar capacitor will be obtained. This type of embodiment is shown in FIGS. 2 or 3 respectively. In this case the conducting layer 4 is conductively connected to the connecting wire 7, whereas the connecting wire 8 is connected to the two lead-in wires 5 and 6. In this way there will be obtained a capacitor whose capacity is twice as large as that of an individual sintered body. Of course, it is also possible to similarly combine three or more sintered bodies to form one single capacitor.

The type of embodiment according to FIG. 3 only differs from the one according to FIG. 2 in that the connecting wire 8 is connected to the lead-in wires 5 and 6 in a different way. As shown, the connecting wire 8 consists of two parts which are vertically connected to one another, so that by the arrangement of the lead-in wires 5 and 6 and from the portions of the connecting wire 8, there will result a multiple cross to which the plastics compound 9, as applied by way of dipping, will adhere particularly well.

What I claimed is:

1. An electrical capacitor comprising two sintered metallic anode bodies positioned close together and having a coating of dielectric oxide thereon, a layer of semiconductive material over said oxide coating, a portion of said semiconductive layer filling the interspaces between said bodies, and an electrically conducting layer over said semiconductive layer and at least partially surrounding the outer portions of said anode bodies to form an integral structure.

2. The electrical capacitor of claim 1, wherein said semiconductive layer surrounds said bodies.

3. An electrical capacitor according to claim 1, wherein said sintered bodies have adjacent parallel axes.

4. The electrical capacitor according to claim 2, including a pair of metal wires connected respectively into said sintered bodies.

5. The electrical capacitor according to claim 4, wherein said wires are connected together and a further wire is connected to said electrically conducting layer.

6. The electrical capacitor according to claim 4, wherein said anode bodies are of tantalum, and said semiconductive material is of manganese dioxide.

7. The electrical capacitor according to claim 6, wherein said bodies and layers are in an envelope of plastic material.